(12) United States Patent
Shackelford et al.

(10) Patent No.: US 7,269,701 B2
(45) Date of Patent: Sep. 11, 2007

(54) SELF-CONFIGURATION OF SOURCE-TO-TARGET MAPPING

(75) Inventors: David Michael Shackelford, Tucson, AZ (US); Gregory Edward McBride, Tucson, AZ (US); David Randall Blea, Tucson, AZ (US); Errol Jay Calder, Vail, AZ (US); Todd B. Schlomer, Tucson, AZ (US); Jimmie Lee Brundidge, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 10/683,179

(22) Filed: Oct. 10, 2003

(65) Prior Publication Data

US 2005/0081006 A1  Apr. 14, 2005

(51) Int. Cl.
   G06F 12/00 (2006.01)
(52) U.S. Cl. ........................... 711/162; 711/112
(58) Field of Classification Search ............... None
   See application file for complete search history.

(56) References Cited

U.S. PATENT DOCUMENTS

| | | | |
|---|---|---|---|
| 5,403,639 A | 4/1995 | Belsan et al. ............... | 395/600 |
| 5,410,667 A | 4/1995 | Belsan et al. ............... | 395/425 |
| 5,440,735 A | 8/1995 | Goldring .................... | 395/600 |
| 5,790,773 A | 8/1998 | DeKoning et al. ...... | 395/182.04 |
| 5,809,511 A | 9/1998 | Peake ......................... | 707/204 |
| 5,915,264 A | 6/1999 | White et al. ................ | 711/168 |
| 6,038,639 A | 3/2000 | O'Brien et al. ............. | 711/114 |
| 6,044,444 A * | 3/2000 | Ofek ........................... | 711/162 |
| 6,078,932 A | 6/2000 | Haye et al. .................. | 707/204 |
| 6,088,814 A | 7/2000 | McKenzie et al. ............ | 714/6 |
| 6,108,749 A | 8/2000 | White et al. ................ | 711/112 |
| 6,119,208 A | 9/2000 | White et al. ................ | 711/162 |
| 6,131,148 A | 10/2000 | West et al. .................. | 711/162 |
| 6,154,748 A | 11/2000 | Gupta et al. ................ | 707/102 |
| 6,182,198 B1 | 1/2001 | Hubis et al. ................ | 711/162 |
| 6,212,531 B1 | 4/2001 | Blea et al. ................... | 717/204 |
| 6,339,775 B1 | 1/2002 | Zamanian et al. .......... | 707/101 |
| 6,341,341 B1 | 1/2002 | Grummon et al. .......... | 711/162 |
| 6,366,987 B1 | 4/2002 | Tzelnic et al. .............. | 711/162 |

(Continued)

FOREIGN PATENT DOCUMENTS

WO    WO-01/57641 A2    8/2001

*Primary Examiner*—Brian R. Peugh
(74) *Attorney, Agent, or Firm*—Harrington & Smith, PC

(57) ABSTRACT

A computer program for automatically pairing target resources 20 such as volumes or logical units to source resources 20 containing data to be copied. Available target pools 48, 50, 52, 54 of target volumes are determined eligible for copying based on a technical compatibility and a user-defined metric such as recovery point or recovery time. User defined metrics and a policy to implement the metrics may be stored in a medium and selected by a user. The source volumes are prioritized, and progressively larger segments of the eligible target pools are searched for a target volume that satisfies the technical compatibility and user-defined metric. Where subgroups such as nested volumes are present in the source volumes, subgroups are also prioritized for searching. Where no target volume can be paired, the corresponding source volume is marked as processed and a search begins for the next source volume. An output report includes pairings of source to target volumes and source volumes for which no pairing was made.

19 Claims, 8 Drawing Sheets

U.S. PATENT DOCUMENTS

| | | |
|---|---|---|
| 6,393,537 B1 | 5/2002 | Kern et al. ................. 711/162 |
| 6,421,767 B1 | 7/2002 | Milillo et al. ............... 711/162 |
| 6,446,176 B1 | 9/2002 | West et al. ................. 711/162 |
| 6,457,109 B1 * | 9/2002 | Milillo et al. ............... 711/162 |
| 2002/0083099 A1 | 6/2002 | Knauss et al. .............. 707/513 |
| 2002/0129214 A1 | 9/2002 | Sarkar ....................... 711/162 |
| 2002/0174098 A1 | 11/2002 | Wu et al. ...................... 707/1 |
| 2002/0184213 A1 | 12/2002 | Lau et al. ...................... 707/6 |
| 2003/0009747 A1 | 1/2003 | Duran ........................ 717/137 |
| 2004/0039891 A1 * | 2/2004 | Leung et al. ............... 711/165 |
| 2005/0081006 A1 * | 4/2005 | Shackelford et al. ....... 711/162 |

* cited by examiner

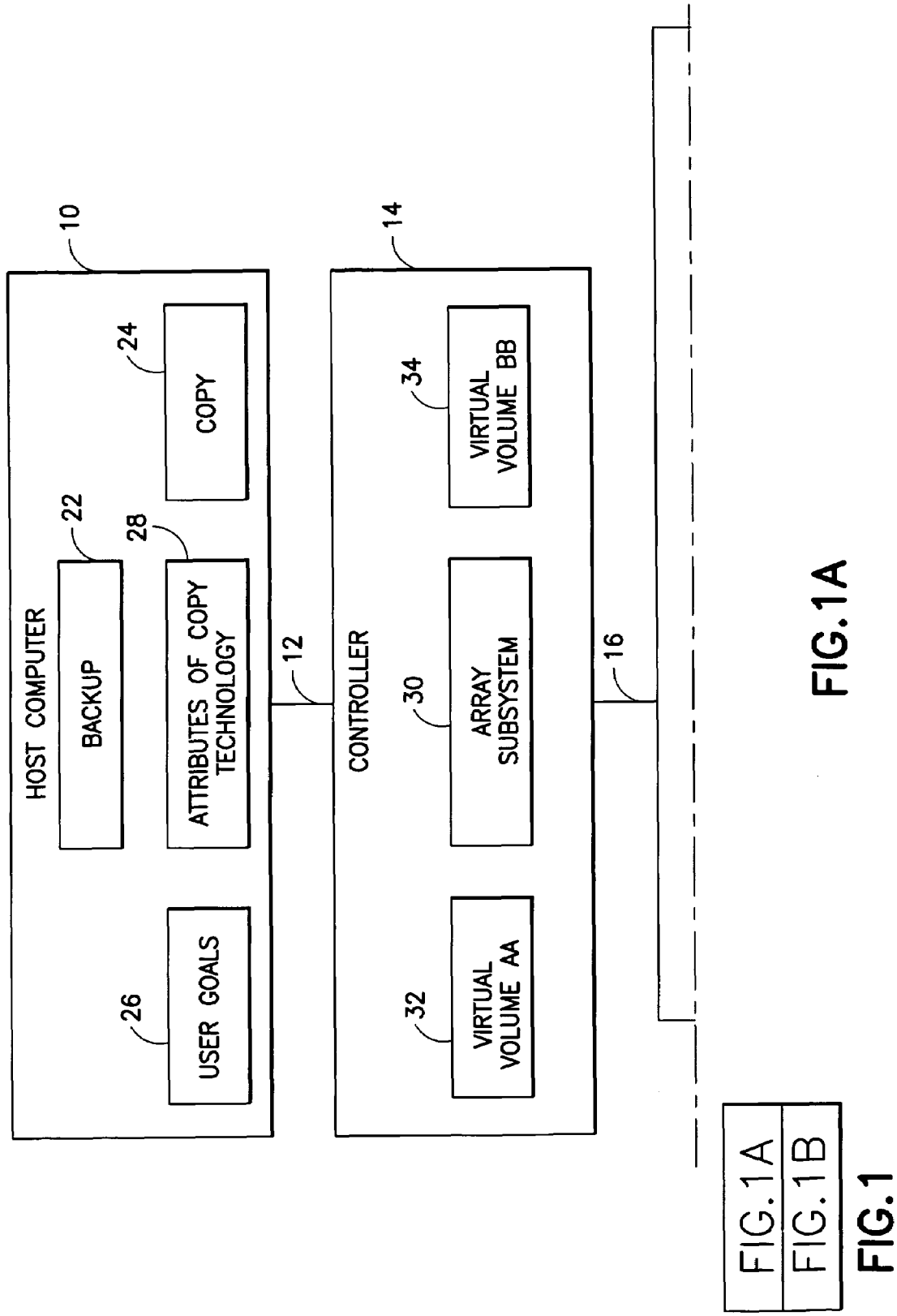

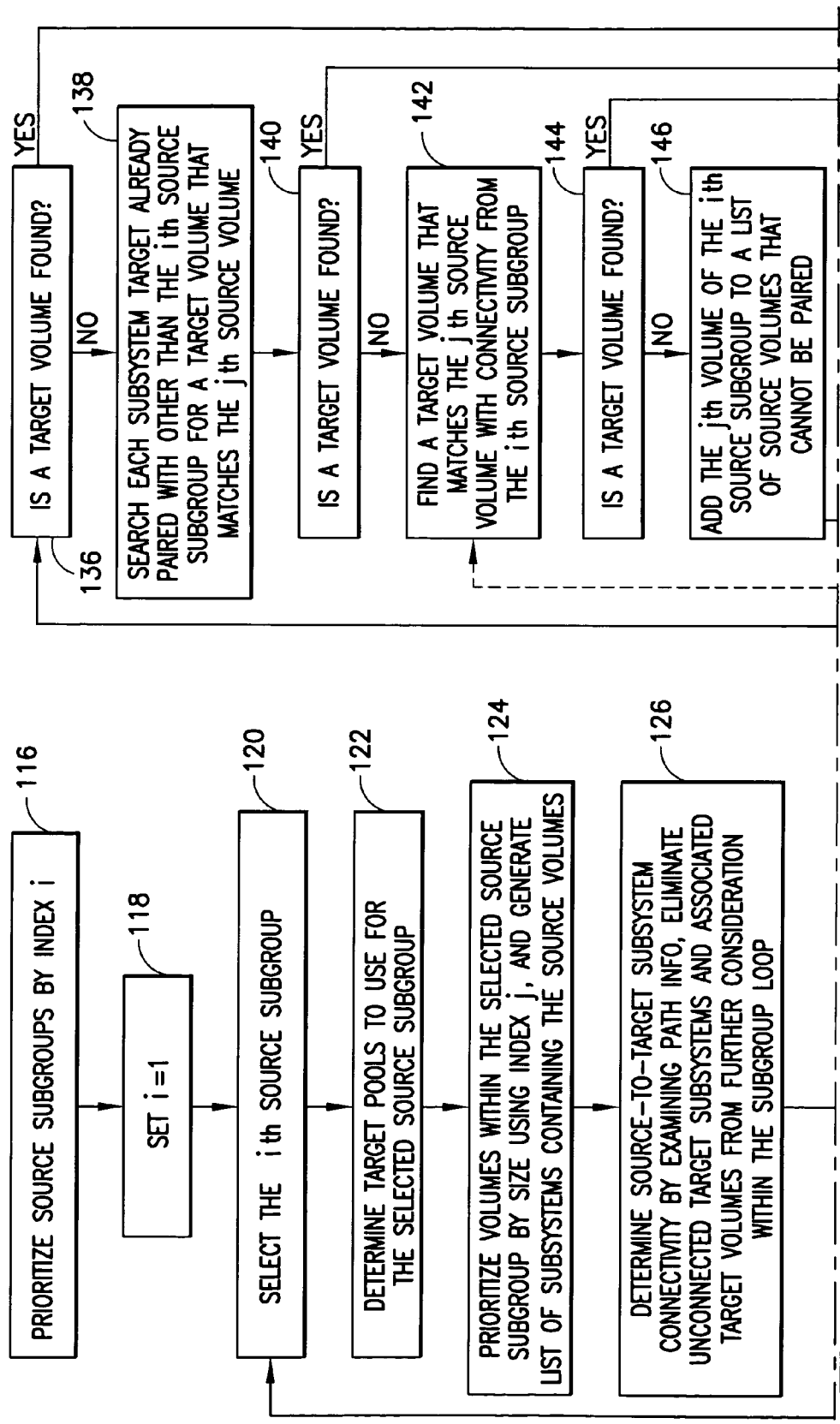

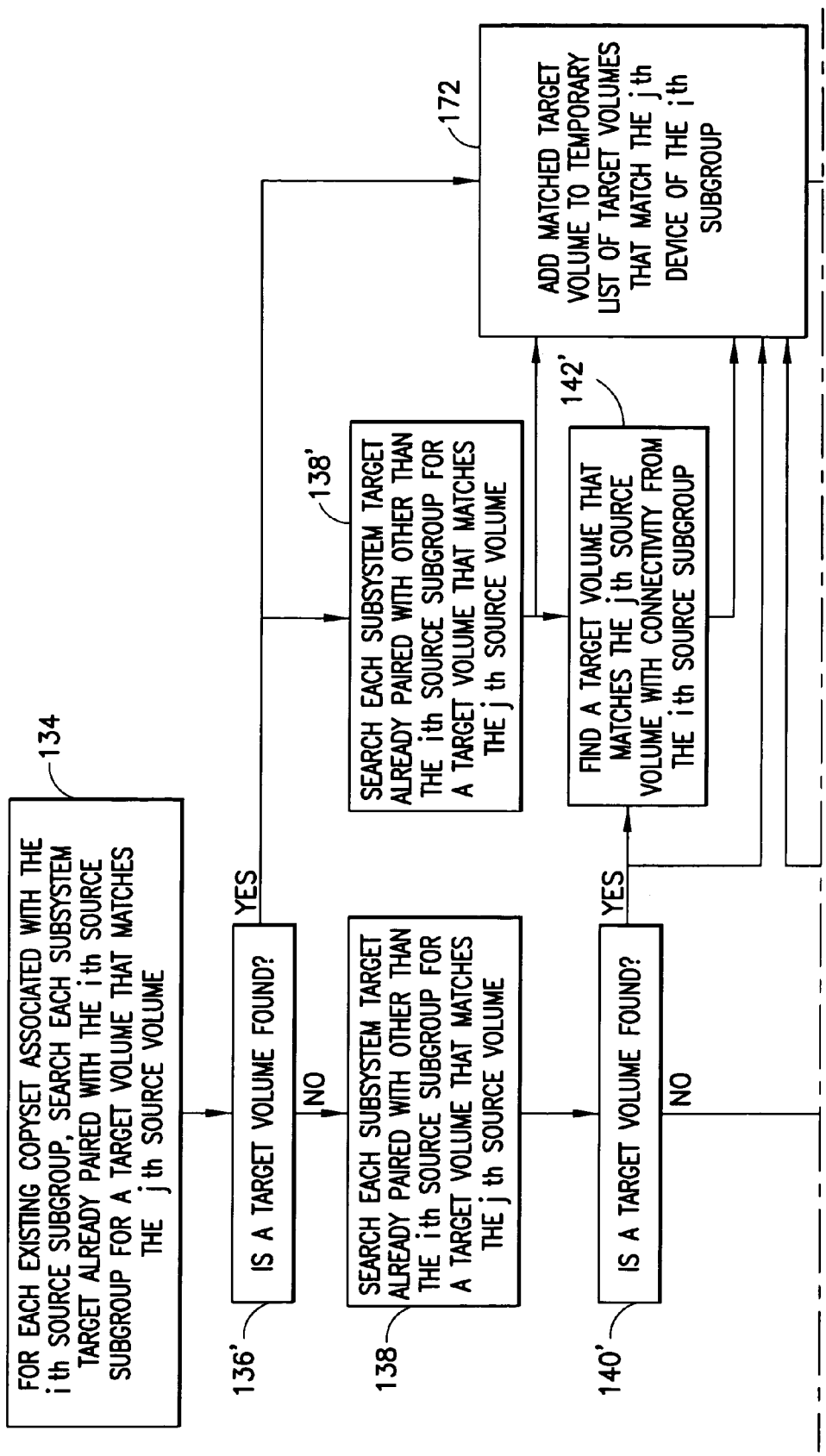

SELF-CONFIGURATION OF SOURCE-TO-TARGET MAPPING

TECHNICAL FIELD

This invention relates generally to automatically configuring a resource by selecting some attributes of another resource, and is particularly applicable to data mapping services. More specifically, the present invention relates to arranging resources, such as target volumes, in groups to expedite a search for an appropriate other resource that is to be configured.

BACKGROUND

In a data processing system, a backup subsystem is typically used to save a recent copy or version of one or more data sets, or a portion thereof, on some form of backup data storage device, such as magnetic or optical disk drives, tape drives, or other memory. The backup subsystem is used to protect against loss of data, should the primary data source become unreliable. For example, if a primary storage location of one or more data sets is destroyed, corrupted, deleted, or changed because of power failure, hardware, or software error, user error or some other type of problem, the latest version of those data sets which are stored in a backup subsystem can be used to restore the underlying data, thus limiting the risk of data loss. Risk of loss is minimized with frequent updates of source to backup (to the extent the source data changes). However, certain changes to the source will eventually require additional capacity in, and reconfiguration of, the backup subsystem. This reconfiguration must also consider that portions of previous primary and backup resources are no longer necessary for the current data set, and should be released for other use.

As but one example, a log-structured array subsystem (LSA) implements "virtual volumes", wherein each virtual volume is created using a "virtual track table" having pointers to "virtual tracks" (i.e., records) in a sequential byte stream. Updated tracks are written to a new location at the logical end of the byte stream, and their associated pointers are reset to the new locations. Thereafter, the tracks at the old location in the sequential byte stream are no longer needed and can be released as free space for reclamation and reuse. The storage can take place in standard direct access storage device (DASD) with sequentially numbered tracks buy the use of an emulation system.

A problem exists in current storage systems that provide the capability to provide a backup copy of data within the storage system. The problem is related to the fact that the system does not select the target storage volume for the copy, but instead requires that the user manually select the target volume. Existing data management software for copy services technologies (e.g., FlashCopy, PPRC, XRC) typically require the user to explicitly select the underlying copy technology to be used. This is primarily due to the fact that each copy type uses different semantics and may be initialized by a different user command. For example, XRC is initialized with commands that begin with X (e.g., XSTART, XADDPAIR, XSUSPEND) whereas PPRC is managed using different commands (e.g., CESTPATH, CESTPAIR). Furthermore, even within a major copy type, certain controlling parameters must be explicitly managed, such as the ERRORLEVEL attribute for XRC and the CRIT attribute for PPRC.

As may be appreciated, this manual selection of volumes, copy type, commands, and parameters can be an error-prone procedure. In addition to manually induced copy type errors, the user may inadvertently select volumes that are in use by other systems, resulting in a possible loss of data. Furthermore, unless the user has an appreciation and knowledge of the internal architecture of the data storage system, the user will not normally select a target volume that is optimal with respect to performance, availability and/or reliability. As but one example, if the user should manually select as a target volume one having one or more tracks located on the same physical disk as the source data, then a disk failure could result in a loss of both the source volume and the target volume. The problem of manual selection of the target volume for a backup copy operation is compounded for those systems having large, virtualized data storage facilities (e.g., tens to thousands of potential target volumes located on hundreds or thousands of physical disks), as well as in those systems that provide heterogeneous and dynamic environments.

Different approaches in the prior art teach automating certain portions or certain aspects of data copying. However, none appear to incorporate all of the advantages of the present invention. For example, U.S. Pat. No. 5,809,511, entitled "Outboard Data Migration in a Volume Stacking Library", teaches migrating data from a source media to a target media. Identifiers associated with the data are obtained from the source data and consolidated in data/identifier pairs in substantially continuous form in the target media. A catalog is created or updated to map the data blocks.

U.S. Pat. No. 5,440,735, entitled "Simplified Relational Data Base Snapshot Copying", describes a relational database management system that permits users to specify copy operations without necessarily specifying details of structure, copy refresh algorithm, and the like. When a user initially defines or registers, for example, a source table, the user specifies a set of predefined attributes. When a user later requests a snapshot copy, the system automatically determines the nature of the copy operation to be performed by matching, for example, the table name with its registered attributes. The system is then able to automatically determine details such as structure of the table, simplifying the specification of copies in a relational database.

U.S. Patent Publication No. US 2002/0083099 A1, entitled "Document/Message Management", concerns automatically transferring data between electronic data interchange (EDI) formats via a computer. Data is transferred from metadata elements of the source data model to variables of a virtual document, based on a mapping that has been previously made. Data assigned to the variables of the virtual document are then transferred to variables of a target data model.

U.S. Patent Publication No. US 2003/0009747 A1, entitled "Apparatus and Method for Porting Applications to Different Platforms", describes using a mapping table function that receives source filenames (preferably flexible UNIX-type filenames) and directory structures and maps them to filenames (preferably more restrictive OS/400-type filenames) and directory structures for a target platform.

U.S. Patent Publication No. US 2002/0174098 A1, entitled "Method and System for Providing a Dynamic and Real-Time Exchange Between Heterogeneous Database Systems", explains a system for dynamically exchanging databases in real-time. A database table migration means is used for executing data migration by selecting a source database and a destination database, and then selecting a source data table as a basis for selecting a migration mode. A data mapping rule is used for mapping a data field via multiple operations and for automatically encoding and interpreting after selecting the source.

The above prior art approaches provide automation of certain aspects of data copying, but either require extensive database searches of every available target volume to find a suitable one, or ignore non-technical aspects of configuring a resource (e.g., a target volume) that would optimize the resource for a user's particular needs, needs that may be related to more than just technical compatibility of resources.

While the above background description relates to data storage, such is deemed merely one application of the principles of the present invention, which may be used to self-configure a compatible resource in any field by matching desired or required attributes in a first resource.

SUMMARY OF THE PREFERRED EMBODIMENTS

The foregoing and other problems are overcome, and other advantages are realized, in accordance with the presently preferred embodiments of these teachings.

In accordance with one aspect of the present invention is a data processing system that includes a data storage subsystem and selection logic. The selection logic is responsive to a copy command that may be invoked by a user, or automatically as in a pre-programmed command to back-up a source database at specific events such as elapsed time, date, change in database size beyond a certain threshold, etc. The selection logic, which is preferably embodied on a computer readable medium, automatically identifies pools of potential target volumes that may be used for data back up. The potential pools may be arranged in any logical grouping such as by RAID, by physical location, by copy type, etc. The pools may be identified as having potential target volumes by a past identification of such (as in when the copy command updates an existing back-up of the database that may be aged), by connectivity with the source volumes carrying the data to be backed up, by technical compatibility with the source volumes, etc. For every instance that at least one target volume within a pool matches both a technical compatibility of a particular source volume and a user-defined metric, the selection logic automatically pairs that particular source volumes to a selected target volume.

In the event that at least one source volume cannot be paired to an appropriate target volume, the data storage subsystem includes circuitry for automatically returning a message listing source volumes for which a pairing could not be made. For those instances wherein a pairing is made, the data storage subsystem also includes circuitry for initiating the copying of data from each source volume to its paired selected target volume. Note that the actual copying is not part of this aspect of the invention, only selecting the target volumes to which the data is copied.

Another aspect of this invention is a computer program product embodied on or in a computer readable media for causing a computer to execute program instructions that result in the computer executing a method of selecting a target device to which data may be copied. The method includes determining at least one source device from which data is to be copied. This may be specified by the user, or may be determined automatically based on the scope of data to be copied and, for example, what volumes that data resides on. The method executed by the computer also includes automatically selecting at least one pool of target devices that are eligible for copying based on at least one of a technical compatibility with the at least one source device and at least one of a user-defined metric. Preferably, all available pools are selected that have connectivity with the source devices. The method further includes automatically pairing one target device from the at least one pool of targets with one source device of the at least one source devices. This one-to-one pairing is preferably done iteratively, with paired devices marked as processed to limit the scope of further iterative searches. Where no appropriate target is found to pair with a source device, preferably an error message is returned indicating such so that a user may take corrective action to ensure all data may be backed up. The method further includes designating the at least one target device as comprising a replica of the data to be copied. Once the replica is populated with the selected target devices that are paired with the source devices, data may then be copied from the source devices in accordance with prior art approaches wherein the replica was populated manually.

Another aspect of the present invention is a method of using a computer to select a target resource that matches a host resource. The method includes determining at least one technical compatibility attribute of a host resource and at least one user-defined metric, and identifying pools of potential target resources that are connected to the host resource via a data pathway. Once the pools are identified, they are searched for a matching target resource that satisfies the at least one technical compatibility attribute and the at least one user-defined metric. Depending upon whether or not an appropriate target is found, the method includes either selecting a matching target resource or outputting a message indicating that no matching target resource was found. The method may be expanded to a plurality of source and target resources, wherein the last described portion may include both selecting a matching target resource for one source device and indicating that no matching target was found for another source device.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1B:
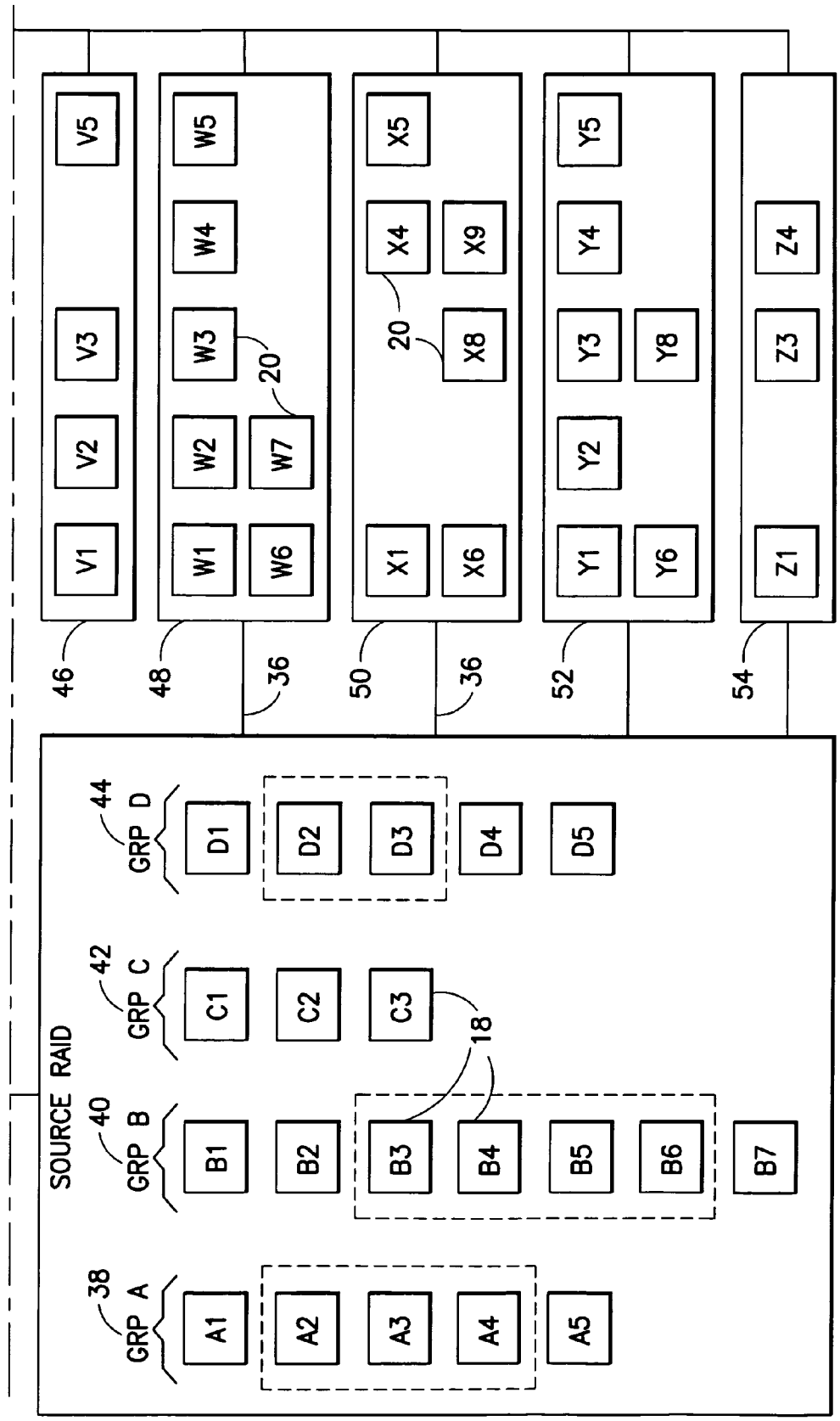
FIG. 1 is a block diagram of a storage system that is suitable for practicing this invention.

FIG. 1 is a block diagram of an exemplary and non-limiting hardware environment or system 10 that can be used to implement the preferred embodiment of the invention. A host computer 10 is coupled via a channel or bus 12 to a storage controller 14, which itself is coupled via an input/output (I/O) channel 16 to one or more source data storage devices 18 and target data storage devices 20. For clarity of explanation, the source 18 and target data storage devices 20 are grouped as physically separated. While physical separation may be desirable for data backup for disaster recovery purposes, it may not be desirable for other purposes and should not be considered limiting to the invention. The source data storage devices 18 may be located at one or more physical locations. The target data storage devices 20 may be located at one or more physical locations that may or may not be co-located, in whole or in part, with the source data storage devices 18. Although one host computer 10 is shown, in practice a plurality of host computers 10 may all share access to the data storage devices 18 and 20, via the storage controller 14. Alternatively, one host computer 10 may be coupled to some or all of the data storage devices 18, 20 through a network such as the internet or an intranet, preferably through a second host computer. In an exemplary and non-limiting embodiment, the data storage devices 18, 20 each comprise RAID (redundant arrays of inexpensive disks) storage subsystems. Those skilled in the art should recognize that any of a number of types of data storage devices may be used in the present invention.

The host computer 10 executes one or more computer programs 22, 24, 26 and 28 that control the operation of the host computer 10 and its interaction with the storage controller 14. As examples, the computer programs 22, 24, 26, and 28 implement a backup unit 22, a copy unit 24, a user goals unit 26, and an attributes of copy technology unit 28, respectively, although other computer programs may be used as well.

Similarly, the storage controller 14 includes one or more computer programs 30 or other logic that controls the operation of the storage controller 14 and its interaction with the host computer 10, and with the data storage devices 18 and 20. In one non-limiting embodiment, the computer program implements a log-structured array (LSA) subsystem 30 that provides the access logic for the data storage devices 18 and 20, although other functions may be provided as well. The LSA subsystem 30 constructs "virtual volumes" 32 and 34 (also labeled as AA and BB) in the memory of the storage controller 14 for access by the host computer 10. The virtual volumes 32 and 34 may emulate a standard direct access storage device (DASD) for data actually stored by the LSA subsystem 30 on the data storage devices 18 and 20. Other emulation techniques could be used as well or, in some embodiments, the storage devices 18 and 20 could be DASD data volumes, thereby eliminating the need for emulation. Alternatively, data from the source device(s) 18 may be copied directly to the target device(s) 20 without the use of virtual volumes 32, 34. Data may be copied from source device 18 to target device 20 through data pathways 36. In practice, such copying typically passes through the storage controller 14. The data pathways 36 are depicted herein apart from the storage controller 14 for purposes of explanation that are clarified below.

For purposes of this disclosure, the following terminology is employed. Source group refers to one or more resources such as storage devices 18 embodying a database to be copied. For purposes of illustration, FIG. 1 depicts four source groups identified as GrpA 38, GrpB 40, GrpC 42, and GrpD 44. A target pool refers one or more available (i.e., not in use or reserved for another use) target resources such as target devices 20 within some logical grouping. Examples of target pools include devices within a RAID, devices disposed at a particular physical location, devices reserved for backing up a particular data set, and devices used in copying a previous version of the database. The universe of available target devices comprises all target pools, but certain available target devices may be within more than one target pool. For purposes of illustration, FIG. 1 depicts four target pools identified as Pool V 46, Pool W 48, Pool X 50, Pool Y 52, and Pool Z 54.

A replica is a set of target devices onto which the database (resident in the source group) may be copied, and may be empty (as in no data has yet been copied) or incomplete (as in the replica reflects an outdated version of the database, possibly lacking only data, lacking a sufficient number or type of target devices, or both). A replica may also exhibit a 'normal' state, such as synchronized or suspended-consistent (wherein no discrepancies are found between the database and the replica for a full or partial comparison, respectively). A copyset is a pairing of a source resource with a target resource, such as a source volume with a target volume or a source logical unit with a target logical unit. A particular copyset may include only the source-target pair, or may additionally include any and all virtual resources such as conduit volumes or that may be necessary in copying from source to target. A logical unit number (LUN) is a unique number (or alpha-numeric designation) that identifies a specific logical unit, which may be an end user, a file, or an application program. As generally used herein, LUN refers to the logical unit identified by the unique number. In computers, a volume is an identifiable unit of data storage. For example, in tape storage systems, a volume may be a tape cartridge. In mainframe storage systems, a volume may be a removable hard disk. Numerous LUNs may reside on one volume, or a volume may hold only one logical unit. While the description references comparing and matching volumes, the invention also contemplates comparing and matching logical units.

Generally, there are two distinct instances whereby a source database is copied to a replica: initially, such as when a database is first assembled and copied to a newly configured replica; and incrementally, wherein an existing replica is updated to reflect the most current version of the source database. Certain aspects of the present invention that apply only to incremental replica updates will be apparent in the ensuing description, and may be disregarded for the instance where a replica is first configured and populated with data.

As described above, source devices 18 must be copied to technically compatible target resources 20. The present invention uses information about the source devices 18, the target devices 20, attributes of the copy technology, and user-defined metrics. The first three are technical compatibility issues. For example, a source volume can only be copied to a target volume of the same type and size. If the source volume is a CKD volume, then the target volume must also be a CKD volume. Type and size are therefore technical compatibility issues.

The present invention allows for a user to specify a metric that the target resource must satisfy. As used herein, a user-defined metric is exclusive of mere technical compatibility between the target and source resources. For example, a user-defined metric may be a business parameter related to the purpose of the data backup., For backup data dedicated to disaster recovery from a catastrophic loss of data at the source location, relevant business parameters may include some or all of the following.

Recovery Point Objective (RPO): the point to which data is recovered, generally specified in time increments. For financial institutions and especially credit card processors, the RPO is typically on the order of seconds or less. For other data, it may range from minutes to days. RPO is a reflection of how often a remote database or replica is updated to reflect the source database.

Recovery Time Objective (RTO): the amount of time it takes to recover data to a useable condition, also generally specified in a time increment.

Location: the physical place to which the data is recovered.

Consistency: In a business distributed environment, certain data depends upon other underlying data and cannot be recovered absent a correct version of the underlying data. For example, assume a retail sale of one item updates an available-cash data sheet and an inventory data sheet. If corruption and subsequent recovery occurs after updating the available-cash figure but before updating the inventory figure, the related data are not consistent. A user may specify, for example, which data sheets require consistency.

Application Impact: a measurement of the amount of impact an application will tolerate. Many copy technologies introduce a performance impact to an application, usually measured in increased response time. Some operations (for example, PPRC Freeze) cause a long-term interruption of all write inputs/outputs for an application. A user may specify an application impact not to exceed a certain time period.

The above are merely examples of metrics that are widely used in the specific application of backup data reserved for disaster recovery. Many other metrics may be used for different applications, and for matching of resources apart from data copying; the specific metric used being only a particular deployment of the present invention. For example, a user may specify that there must be more than one data pathway 36 between source 18 and target 20 volumes. While the existence of a data pathway 36 is by necessity required for technical compatibility, specification of more than one pathway 36 is a user-defined metric because the second pathway 36 specified is not required except by the choice of the user.

Another user-defined metric may be that a selected target volume reside on a separate physical disk, or on a separate RAID array, as compared to the associated source volume. This is generally desirable because reads can occur from one physical disk and the writes to another. If the copying were to occur to the same physical disk, then the disk would have to read from one sector (source) and written to another sector (target), thereby reducing performance by a factor of at least two and exposing source and target to simultaneous risk of loss. Another user-defined metric may be the response time of the selected target volume. One example of a suitable metric that is indicative of response time is the disk rotational speed (e.g., 15,000 RPM versus 10,000 RPM), which can be stored in the attributes of copy technology 28. Another user-defined metric may be the "busyness" of the target volume. One example of a suitable metric for indicating the busyness is the amount of time required for the controller 14 to return a response to a write command sent by the host computer 10. The preceding user-defined metrics should not be viewed as exhaustive, as others may also be employed, in addition to or in place of those described above.

In accordance with the present invention, the user may set a policy that implements the user-defined metric(s). The policy may require that a selected target volume or target resource fully satisfy each and every metric, at least a minimum number of the total metrics, at least certain specific metrics designated as critical (e.g., RPO for a financial institution), or a threshold match or best match of the target resource to the designated metrics. The above are self-explanatory except for threshold match or best match of resources. A minimum or best match is analogous to a 'distance' between the user-designated list of metrics and the corresponding attributes of the nearest target resource, with differences between the user-specified value and the value of the target weighted. Weighting may be determined by a default scheme related to the metric entered or by the user him/herself. For example, assume RPO for target resources is divided into segments {RPO=0, 0<RPO○ 5 seconds, 5 seconds<RPO○ 10 minutes, RPO>10 minutes} and assigned corresponding numeric values {0, 1, 5, 20}, respectively. A user designating RPO not to exceed 5 seconds would define a 'distance' from a target with RPO=0 as zero (or −1 if negative values are allowed to reflect exceeding a minimum user designated metric). A target with RPO=2 minutes would define a 'distance' of 4 (numeric value of 5 from the target minus numeric value of 1 from the user designation), and a target with an RPO=14 minutes would define a 'distance' of 19 (numeric value of 20 from the target minus numeric value of 1 from the user designation). Distances may be calculated on each metric for each available target resource, and those with either the minimum distance (best match) or a distance within a prescribed limit (threshold match) are those selected as available and appropriate target resources. A computer program within the present invention may include, for example, a pre-programmed list of metrics in a computer-readable storage medium and accessible via a pull-down menu, from which a user may select those appropriate to his/her purposes and enter field values for each selected metric. Similarly, such storage medium may also include a list of user policies from which a user may select to implement the chosen metrics.

Figure 2:
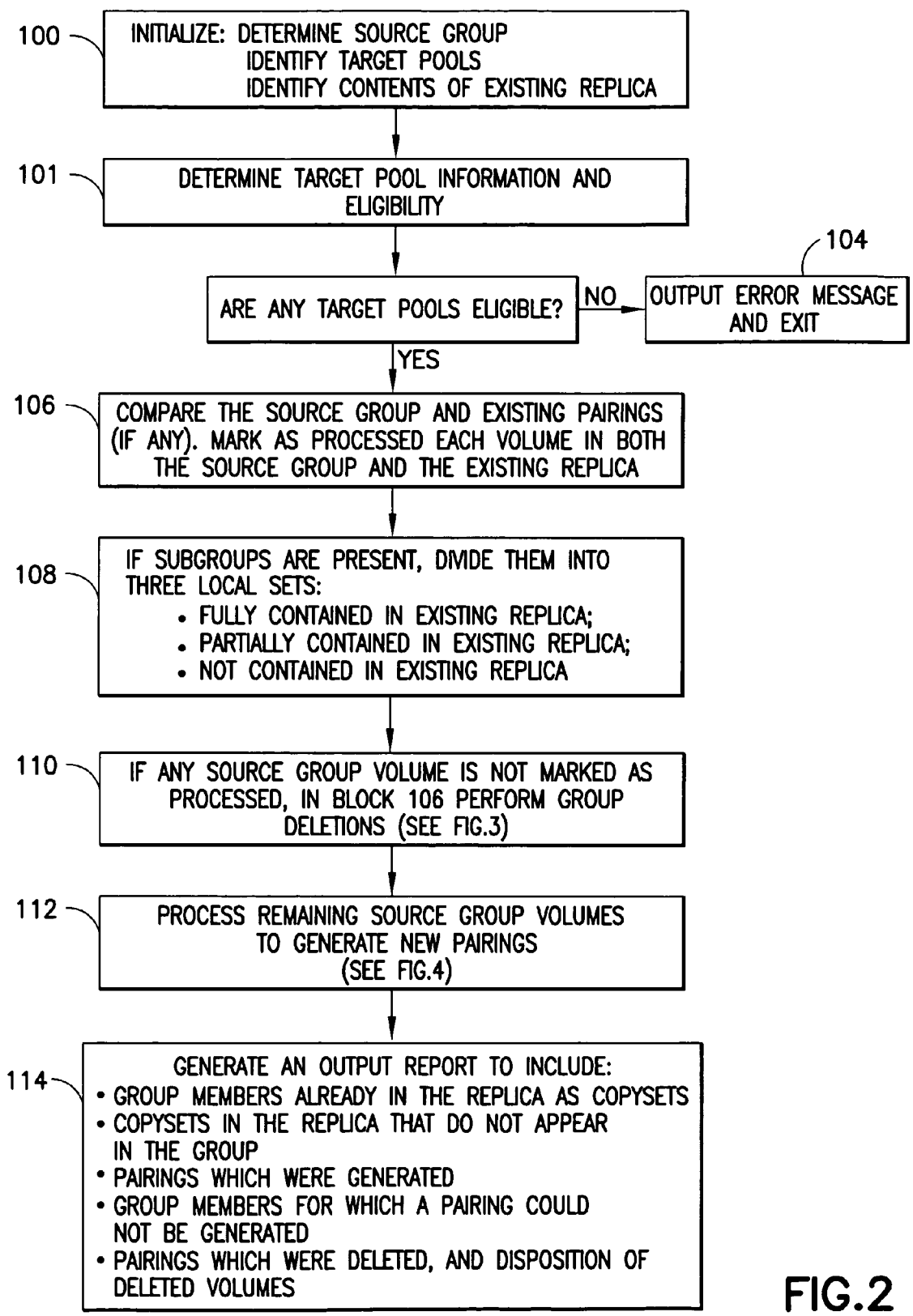
FIG. 2 is a high-level block diagram showing self-configuration of source to target mapping.

FIG. 2 is a high-level block diagram showing how self-configuration of source to target mapping proceeds. Given a command to copy a database (generate a replica), whether initially compiling a replica or updating an existing one, the present invention initializes at block 100. At block 100, three main items are determined: the source group, the target pools known from an exiting replica, and the contents of an existing replica that is to be superceded by the replica to be created by the copy command. The latter two apply only to an incremental update of an existing replica.

For an initial replica, the source group must be externally defined. Where an existing replica is present at block 100, the source group 38, 40, 42, 44 includes the source group previously used to generate that existing replica, plus any volumes or devices newly added since then. Within the source group may be subgroups of devices that are nested or interrelated to one another, such as nested volumes. Nested volumes may include volumes whose data is interdependent on other volumes within the nested subgroup. This nesting of volumes is preserved by annotating each nested member with an identifier for the nest or subgroup to which. it belongs. Preferably beginning with the largest nest, the source group is expanded, if necessary, in a recursive manner to include all volumes belonging to a nest that may not have been identified in the previous source group that was copied to an existing replica.

Where an exiting replica is available, target volumes of that replica are used to identify target pools. Also, existing pairings of source 18 and target 20 resources are also already known, and can be retained at block 100 to enable a more efficient copying of the entire database.

Information concerning target pools 46, 48, 50, 52, 54 that were identified at block 100 is already known. Such information may include target resource size, structure, physical location, type, etc. Exact matching of parameters between source 18 and target perfectly satisfies both technical compatibility and each user-defined metric. Certain mis-matches between user-defined metrics may satisfy the user-defined policy, depending upon any flexibility built into such a policy as noted above in the examples of best-match and threshold-match. At block 101, a search is conducted for target pools that are available and eligible, whether or not certain target pools were identified at block 100. Because those identified at block 100 are in use for the existing replica, they may be assumed available and eligible, or may be evaluated for eligibility in the event changes to the source group or user-defined metric rendered some of them ineligible.

A pool of potential target devices may be determined as eligible for being a target pool in several ways. A target pool may be defined as, for example, a RAID, a single volume, or an entire data storage facility having one or more volumes that meet the technical compatibility criteria and user-defined metric. The target pool(s) may be designated by the user and specified when the user enters a command to back-up the source database, as in the case of a dedicated data backup facility. Similarly, certain target resources 20 may be dedicated to data backup purposes and therefore allocated only to a particular replica matched to a particular source group. Any of these designated targets may be used as a target device 20, a conduit device that facilitates copying (such as the virtual volumes 32, 34 used as conduit volumes), or either. Target pools may be determined eligible based on its matching the user-defined metric(s) (or not matching, if the user-defined metric so states) and one or more specific parameters of the replica (if one already exists) or the source group. For example, a user-defined metric may require that no target device 18 be co-located with any source device 20, or that a pairing of source-target devices not be co-located (but allowing sources and targets holding disparate data to be co-located), or that all targets be located in a particular data storage backup facility.

Target pools may be determined eligible based on accessibility, or the presence of a data pathway 36, consistent with the copy rules associated with the particular copy type. For example, one way to determine accessibility is to begin from the source group and track outgoing data pathways 36 to determine which subsystems are eligible (other parameters of user-defined metrics and compatibility being satisfied). The subsystem may be a logical grouping according to physical location, for example, though the source group and the target pools may not be amenable to division into subsystems in all cases. All of the target pools that contain volumes within each such subsystem are eligible. Assuming an arrangement whereby volumes in use by an existing replica (for an incremental replica update) are marked as in-use rather than eliminated from further consideration in updating the replica, the target pools that include those in-use volumes may be deemed eligible. Using the example of GrpA of FIG. 1, and assuming for purposes of this description that the I/O channel 16 is not appropriate as a pathway 36 for data copying from source to target, then target pool V 46 is not eligible because it lacks a data pathway 36 from the source group, GrpA 38. Further assuming that Pool W is of a different type and that Pool Z fails to satisfy a mandatory user-directed metric or a user-directed policy, then block 101 of FIG. 2 would find target pools X 50 and Y 52 eligible. Devices of FIG. 1 that are conspicuous by their absence, such as X2, X3, X7, X10 of Pool X 50 and Y7, Y9, Y10 of Pool Y 52, represent devices not available for use with the current replica, such as devices already in use for another purpose.

At block 102, a decision is made as to whether any target pools are eligible. If none are, an error message is output at block 104 reflecting that a back-up copy cannot be made. So long as at least one target pool is deemed eligible at block 102, then the source group is compared with existing pairings (e.g., from an existing replica), if any, and each volume in both the source group and the existing (previously generated) replica that forms at least part of the eligible target pools are marked as processed at block 106. Once marked as processed, a volume, whether a source device 18 or a target device 20, is removed from further consideration in this particular iteration of configuring a replica from the source database.

At block 108, it is determined whether subgroups are present in the source group (such as nested volumes as determined in block 100). If subgroups are present, they are divided preferably into three local sets as follows. One set contains all subgroups that are fully contained in the replica, one set contains all subgroups that are less than fully contained in the replica, and the last set contains all other subgroups, or those with no elements in the replica. Continuing the example of GrpA 38 of FIG. 1 as the source group, assume A2, A3, and A4 constitute a sub-group of nested volumes as denoted by the dotted line encompassing them. The subgroup may be fully contained in a target pool (e.g., copied in devices Y3, Y4, and Y5), it may be partially contained (e.g., source devices A2, A3 copied in target devices X4 and X5), or not at all.

Figure 3:
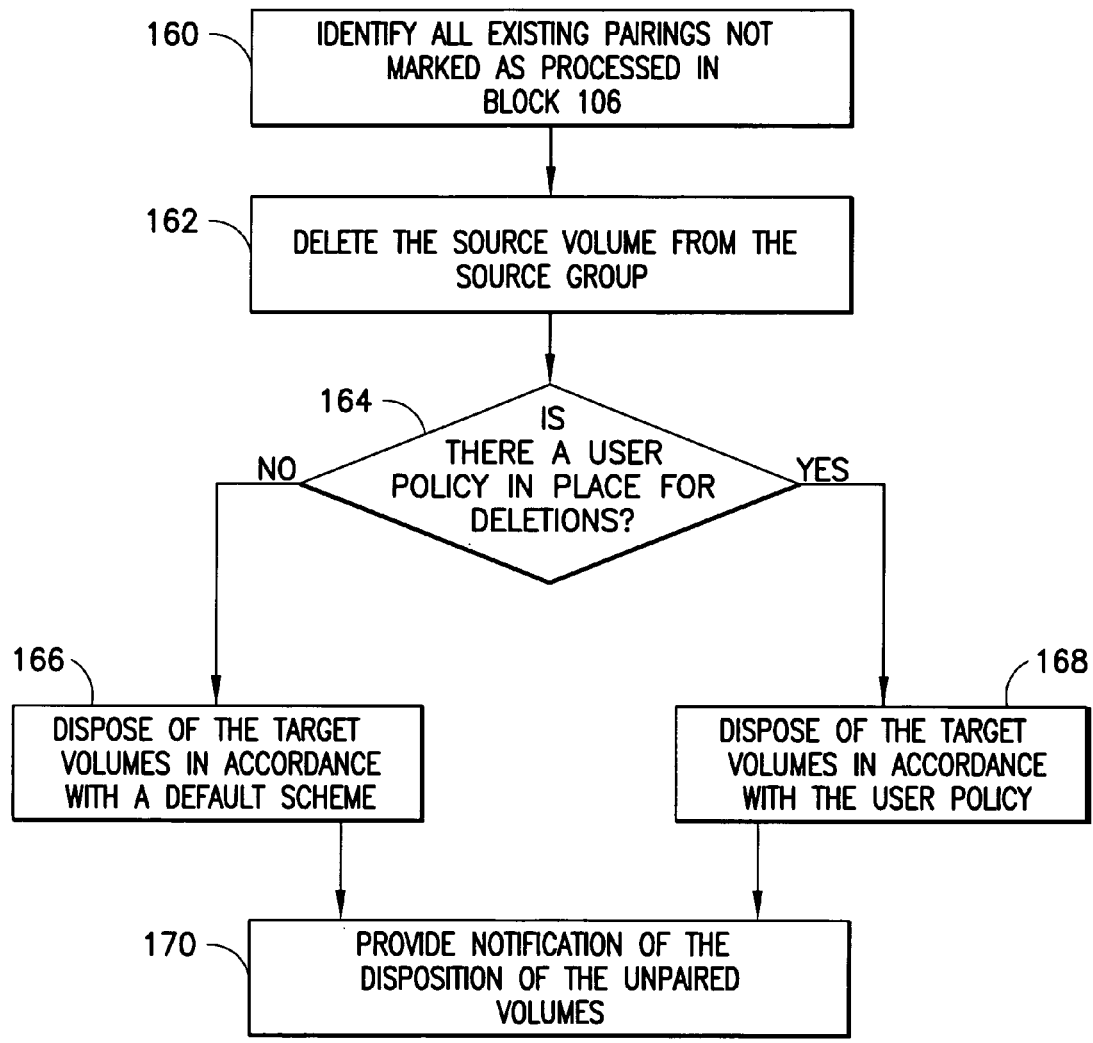
FIG. 3 is a detailed flow diagram depicting the automated-deletion of source group volumes noted at block 110 of FIG. 2.

At block 110, all paired source devices 18 and target devices 20 that are not marked as processed are reviewed. Those not marked as processed indicate a pairing that is no longer valid for the present replica, and are processed in accordance with FIG. 3. FIG. 3 begins at block 160 wherein all pairings determined form an existing replica between a source group device 18 and a target device 20 that were not marked as processed at block 106 are identified. Any such pair is indicative of a change in the source group since the time the existing replica was generated. At block 162, all such pairing are deleted. This is not to say that the underlying data is deleted; only the logical copy relationships on the hardware that may exist are deleted. The source devices 18 of these deleted pairs is made available for other uses. At block 164, the system determines whether or not a user-defined policy has been assigned to deal with the disposition of target volumes so deleted. If no such policy is in place, a default scheme is employed at block 166 to dispose of the target volumes. If a user policy is in place for this purpose, it is implemented at block 168 for each of the relevant target devices 20. Examples of default schemes or user defined policies include, for example, leaving the target device in physical relationship with the source group, deleting the physical relationship, returning the target device to the pool from which it came for re-use, and reserving the current value of the target device (wherein it is marked as in use when queried by other applications). The latter scheme may also include reserving the target device for a period of time (e.g., two days) after which it is deleted and returned to the pool and made available for use by other applications. Regardless of whether the target device is processed in accordance with a user scheme or a default scheme, a notification is optionally sent regarding disposition of the target device 20 at block 170. This notification may include SNMP events or other computer-to-computer notifications to other relevant system components in the context of an autonomic system, or listing of the unpaired source and/or target devices and their disposition, or preferably both.

Blocks 162-166/168 (as the case may be) may be performed iteratively or in bulk. For example, iteratively may include indexing the list identified in block 160, and sequentially processing each indexed pair in accordance with blocks 162-166/168 until all indexed pairs are processed. Bulk processing may be performed, for example, wherein all pairs are identified and processed in a batch mode. All unmarked source devices are made available en masse for other uses, and the target volumes are disposed of en masse in accordance with blocks 166 or 168.

Figure 4B:
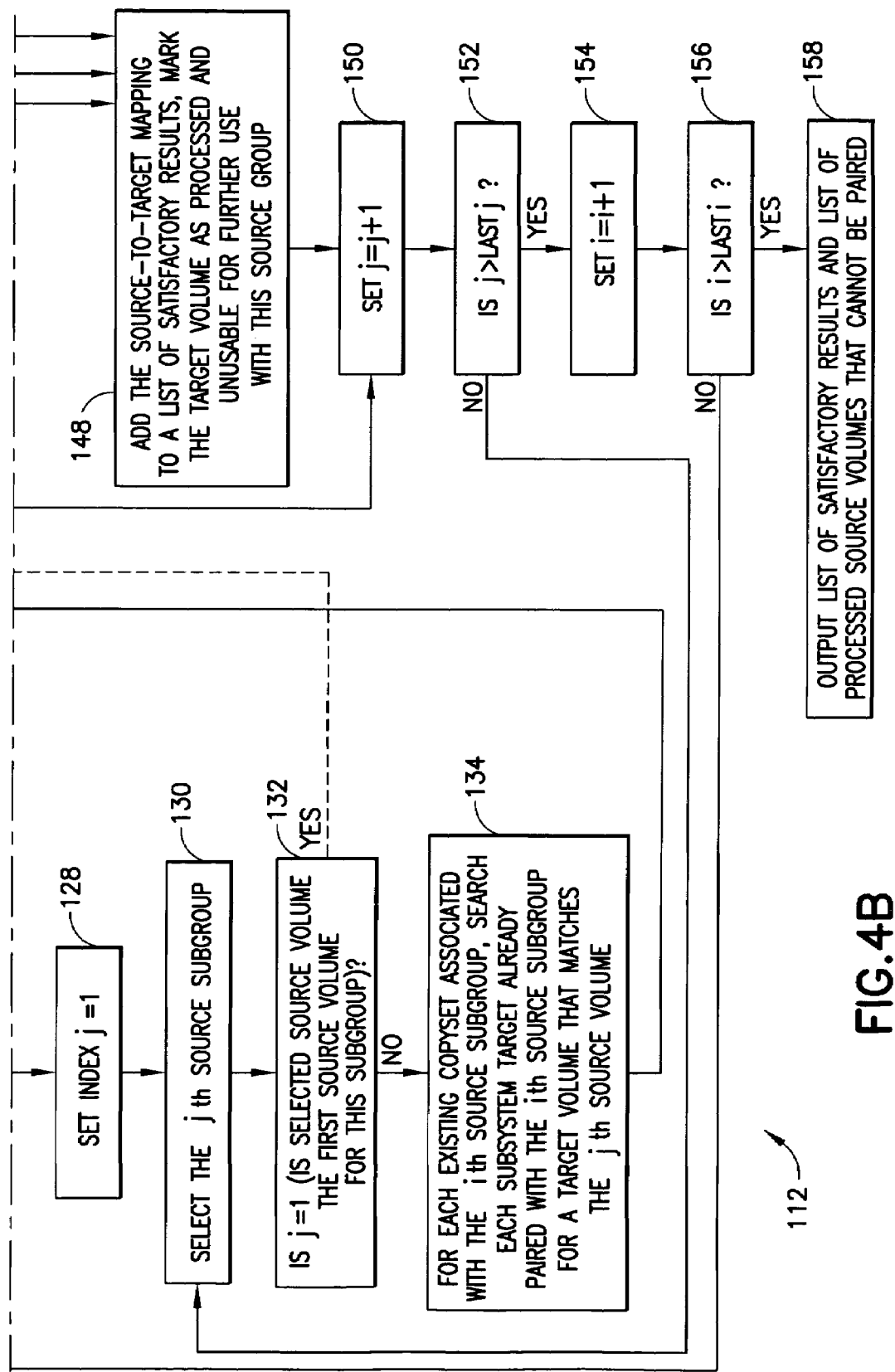
FIG. 4 is a detailed flow diagram depicting the automated pairing of source group volumes to target group volumes noted at block 112 of FIG. 2.

Whether or not any unmarked pairs are processed in accordance with FIG. 4, the flow diagram of FIG. 2 follows with block 112. At this point, those source devices 18 not marked as processed but previously paired with an existing volume have been deleted at block 110. This leaves only unpaired and unprocessed source volumes for processing at block 112, wherein all source devices 18 in the source group that are not marked as processed are paired with a target device 20 in accordance with FIG. 4, described below. Once all source devices 18 are paired to target devices 20 (or at least processed where an appropriate target device 20 is not found), an output report is generated at block 114 reflecting the status of the data copying. Preferably, such a report indicates new pairings generated for the current replica, and source group devices 18 or volumes for which a pairing could not be generated. The report may also indicate group members already in the replica as copysets (i.e., source-target pairings in a previous replica wherein the pairing was maintained in the current replica), copysets in a previous replica that do not appear in the source group (that may be deleted once the current replica is complete), and/or pairings that were deleted and the disposition of deleted target volumes.

FIG. 4 is a detailed flow diagram depicting the automated pairing of source devices 18 to target devices 20. The arrangement of FIG. 4 assumes that the number of source-to-target subsystems is to be minimized. Where the subsystem is defined as a physical location, a particular RAID, or the like, the assumption is that the target devices should be spread over a minimum number of physical locations, a minimum number of distinct RAIDs, etc. While this is a typical constraint in practical use, it is not limiting to the present invention; target devices may be spread over numerous subsystems without departing from the teachings herein. Also assumed in the specific arrangement of FIG. 4 is that the ability to copy a subgroup is the highest priority. The latter assumption allows increased efficiency in pairing targets to sources, and preserves subgroups in the replica.

At block 116, the source group is polled for subgroups such as nested volumes, which are prioritized and numbered (i is an index used in FIG. 4 to identify the numbered subgroups). Preferably, the largest subgroups are processed first, so the prioritization is by subgroup size. Considering the three local sets generated at block 108 of FIG. 2, the source subgroups fully contained in the replica are processed first. Once all the subgroups in that local set are exhausted, the subgroups within the local set that are only partially contained within the replica are processed next, followed by the subgroups that are not contained within the replica. Thus, the first subgroup processed under FIG. 4 is the largest subgroup in the fully-contained list.

At block 118, the index i is initialized, and at block 120 the $i^{th}$ source subgroup is selected. At block 122, the pools of target devices 18 (for which information was gathered at block 101 of FIG. 2) are polled for use with the selected subgroup, and appropriate target pools are selected Specific source devices 18, such as individual volumes, within the $i^{th}$ source subgroup are prioritized and numbered, preferably by size, and accessed using a different index j at block 124. A list of subsystems containing the source devices 18 is then generated, for minimizing source-target subgroup pairings as described above. All target pools and/or target volumes for which there is not a data pathway 36 from the $i^{th}$ source subgroup are eliminated at block 126 from further consideration with this particular $i^{th}$ source subgroup. The data pathway 36 need not be limited to a physical bi-directional data link, but may be additionally defined by the copy type to be executed. For example, in PPRC a communication path is required. For FlashCopy, the target device may be required to be located, as compared to the source device, on the same RAID array, within the same logical grouping, or under the same storage controller. These copy-specific connectivity requirements may be used to limit the universe of target subsystems identified at block 126.

Next, individual volumes in the $i^{th}$ source subgroup are considered. Each such volume or source device 18 has been indexed a block 124 using the variable j. The index j is initialized at block 128 and the $j^{th}$ source volume is selected at block 130. Block 132 is a decision, wherein if j=1 (the first volume of each source subgroup), the flow diagram skips to block 142 as described below. For all other j wherein j∘ 1, block 132 leads to block 134 wherein, for each existing copyset associated with the $i^{th}$ source subgroup, a search is conducted from a matching target volume among each subsystem that is already paired with a volume within the $i^{th}$ source subgroup. The match is traditionally based only on volume size, but may be extended to any characteristic that can be matched. For example, volume geometry (e.g., IBM 3380 track format versus 3390 track format versus fixed block format), array residence (which array holds the data), ability to perform a further copy (to export data to reconstitute a compromised source database), and performance statistics may all be used in place of or in addition to volume size as a characteristic to be matched. If a matching target volume is found in block 134, then block 136 leads to block 148, wherein the mapping of source device 18 to target device 20 is entered on a mapping list, the target volume is marked as processed and removed from further consideration for the current replica. If no appropriate target volume is found at block 134, then block 136 leads to a continued search at block 138.

Block 138 searches for the same target volume as described in block 134, but the search is not constrained to target subsystems identified by existing copysets associated with the $i^{th}$ source subgroup. Rather, the search at block 138 expands the search to target subsystems identified by existing copysets associated with any source subgroup. Preferably, the target subsystems already searched in block 134 are excluded from the search at block 138, as it would be repetitive. Block 140 is similar to block 136 in that if an appropriate target volume is found from the previous step, the diagram leads to block 148 as described above, but if no volume match is found, a continued search is conducted at block 142. The search at block 142 follows directly from either no matching target volume at block 140 or alternatively from the first volume considered (j=1) for each $i^{th}$ source subgroup. This is the broadest search to generate a new pairing, and seeks only to match a target volume size to the source volume size. Connectivity between via a data pathway 36 is previously assured from block 126.

The following example is presented to illustrate the various searches conducted at blocks 134, 138, and 142. Assume that the source group includes three subgroups 1, 2 and 3, and that the universe of target subsystems identified in block 126 consists of target subsystems A, B, C, and D. Assume further that there is a copyset linking source subgroup 1 to target subsystem A, another copyset linking source subgroup 2 to target subsystem B, and a third copyset linking a previously processed device from source subgroup 3 to target subsystem C. Subgroups 1 and 2 have been processed in total and the current $i^{th}$ subgroup is subgroup 3, so i=3. The current $j^{th}$ source device or volume is not the first volume for this subgroup since there is already a copyset associated with this source subgroup (so block 132 leads to block 134), so arbitrarily set j=7 for the current volume. The search at block 134 for volume j=7 is limited to target subsystem C, since copysets associated with source subgroup i=3 identifies only that target subsystem. If no match is found there, the search at block 138 is expanded to include target subsystems A and B. As assumed above, previous processing for source subgroups i=1 and i=2 found copysets that identify target subsystems A and B, which sets the scope of the search at block 138. Though a copyset for target subsystem C also exists, that subsystem was already searched at block 134 and is preferably not searched again for the same volume j=7. If no match for i=3 and j=7 is found in target subsystems A and B, the search at block 142 is expanded to include target subsystem D. Target subsystem D represents the universe of target subsystems identified at block 126, less those subsystems already searched (subsystem C searched at block 134 and subsystems, A and B searched at block 138). Thus the searches are expanded recursively until a match for i=3 and j=7 is found.

If an appropriate target volume is found via the expanded search of block 142, then block 144 directs the flow chart again to block 148 as previously described. If no matching target volume is found from the most expansive new-pairing search of block 142, then the selected volume (the $j^{th}$ volume of the $i^{th}$ source subgroup, which was not paired) is added to a list of volumes that could not be paired with a target volume at block 146. Each of blocks 134, 138, and 142 provide an increasingly larger portion of the universe of eligible target pools to search, until either a pairing is made or a determination is made that no pairing can be made. Whichever the result, the index j is increased by one at block 150. So long as the increased index j does not exceed the maximum or last j in the index set forth in block 124, the volume search loop (blocks 130-152, inclusive) is repeated for the next volume within the $i^{th}$ subgroup. If instead the increased index j does exceed the maximum or last j in the index (e.g., all volumes in the $i^{th}$ subgroup are processed), the index i is increased by one at block 154 and the subgroup loop (blocks 120-156, inclusive) is repeated for next subsequent subgroup (if any), so long as the increased i index from block 154 does not exceed the maximum or last i index determined at block 116. If it does, then the pairing is complete at block 158, and a list of satisfactory results (pairings) is output along with a list of source volumes that could not be paired, if any. It is noted that pairings as used herein is not limited to source and target volumes only, but may also include conduit volumes as detailed previously. Further output contents may be as described with reference to block 114 of FIG. 2. It is noted that each target volume marked as processed at block 148 is no longer considered available in subsequent iterations of the flow diagram of FIG. 4, preferably eliminated at block 126 of the next subsequent iteration.

Figure 5B:
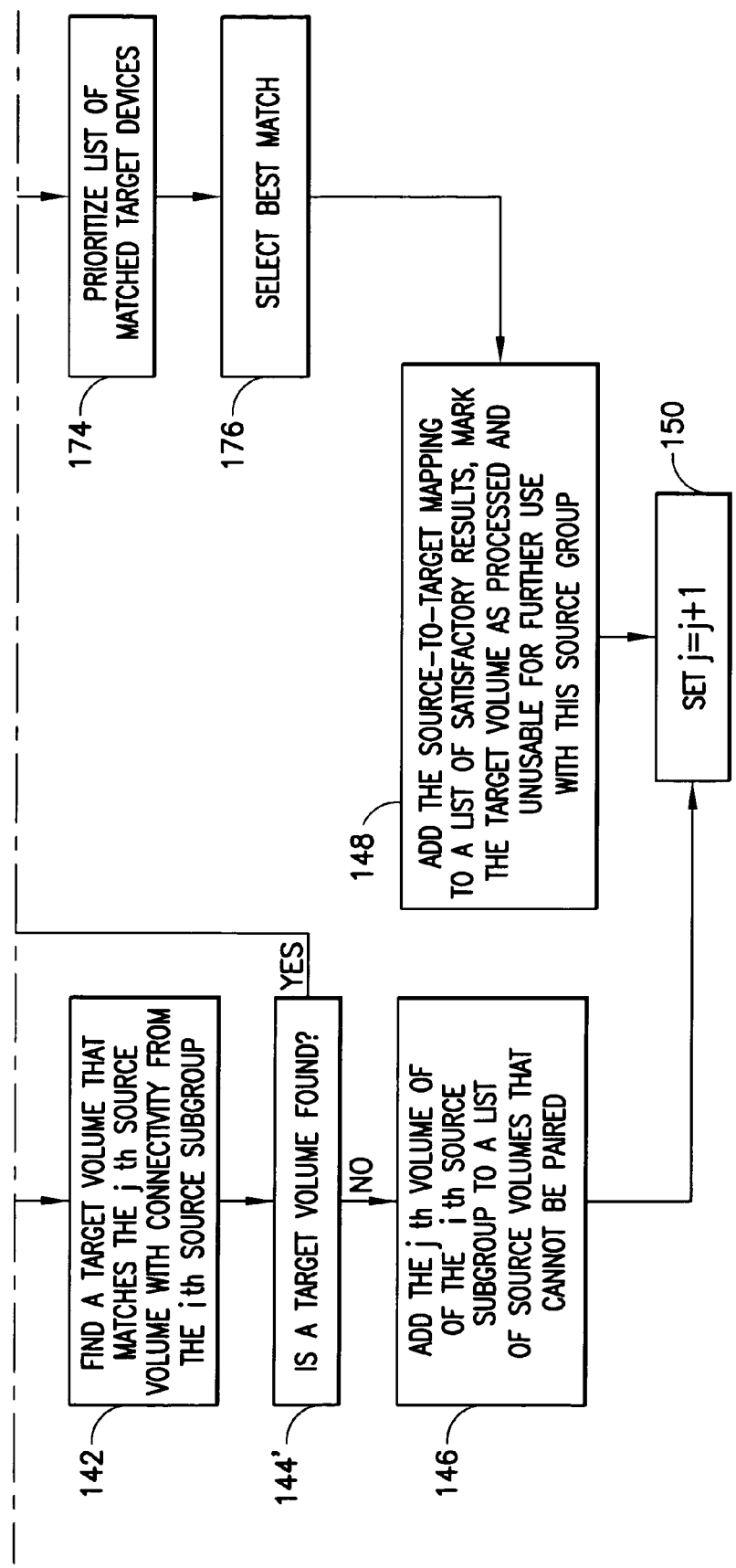
FIG. 5 is a flow diagram that substitutes for a portion of the flow diagram of FIG. 4 in an alternative embodiment, wherein the best of multiple matched targets is selected for pairing.

The diagram of FIG. 4 describes ceasing a search once a match is found between a target device and a particular source device. FIG. 5 illustrates a variation of FIG. 4 whereby the entire universe of target subsystems identified at block 126 is searched for each source device. This will inevitably result in more than one match for a particular source device, so the matches are prioritized and only the best match is output and the remaining matches are returned to the universe of available devices. The diagram of FIG. 5 replaces the blocks 134-150 of FIG. 4, inclusive. If no match is found among any of the searches, blocks 134, 136', 138, 140', 142, 144', 146 and 150 operate identically to blocks 134-146 and 150 of FIG. 4. If instead a match is found at any of the searches, the matching targets are retained in a temporarily list at block 172, and an expanded search is continued at blocks 138' or 142'. Each $j^{th}$ source device undergoes a search for matches over the entire universe of targets identified by block 126 of FIG. 4 (with the exception of matches marked as processed). All matches are listed at block 172. When the final input to the list is added from either block 142' or block 144', the list is prioritized at block 174, and the best match is selected at block 176. The single best match is marked as processed at block 148, the index j is adjusted at block 150, and further steps are conducted as described above with reference to FIG. 4. The best match may be determined according to user-defined metrics or user policy as detailed above.

Each of the actions described above are preferably executed by a computer program automatically once a user inputs the user-defined metrics, and optionally a user policy for implementing those metrics, and the user executes a computer command to generate or update a replica of the source group.

The end result is that user-induced errors that can result in lost data are eliminated, ease of use is greatly enhanced, and the user need not become involved in selecting the target volumes. In addition, the copying occurs in those volumes that have been determined to be the most optimum, as defined by the user via the stipulated metrics and policy.

Note that while this enhanced functionality made possible by this invention is shown as residing at the level of the host 10, in other embodiments this functionality could be implemented in the data storage subsystem, such as in the controller 14. One advantage of the list of available volumes residing in the controller 14 is that the target volumes reserved by the storage subsystem for copying can be removed from the pool of potential volumes that are accessible by other users. For example, target devices that are conspicuous by their absence from FIG. 1 (e.g., V4, X2, X3, X7, etc.) may have been removed from accessibility for the copying described herein because they were in use by another entity, or otherwise not available for this copying. In this embodiment the controller 14 can be informed that a replication command has been invoked by a message received from the host 10 through the bus 12.

It is also within the scope of this invention, for a case where no suitable target volume is found, to employ the controller 14 to create a target volume that matches the target volume requirements, and then use the newly created volume as a target volume.

Based on the foregoing it should be realized that an aspect of this invention is computer program product embodied on or in a computer readable media for causing a computer to execute program instructions that result in the computer executing a method of performing a backup of data. The computer could be at the level of the host 10, at the level of the controller 14, or at both levels in a cooperative arrangement. Where multiple hosts 10 and multiple controllers 14 are coupled to one another an to source 18 and target devices 20 through an internet, an intranet, or other data-exchange medium, the computer program product may be resident only partially in any one of the hosts 10 and/or controllers 14 and/or other components. The ensuing claims, and the present invention, imposes no requirement that all aspects of a corresponding computer program reside in any one particular location or machine.

The foregoing description has been a full and informative description of the best method and system presently contemplated for carrying out the present invention that is known to the inventor at the time of filing the patent application. Of course, many modifications and adaptations will be apparent to those skilled in the relevant arts in view of the description when read in conjunction with the accompanying drawings and the appended claims. While the system and method described herein are provided with a certain degree of specificity, the present invention could be implemented with either greater or lesser specificity, depending on the needs of the user. Further, some of the features of the present invention could be used to advantage without the corresponding use of other features. In addition, the various blocks shown in FIGS. 2-4 could be presented in a different order. As such, the foregoing description should be considered as merely illustrative of the principles of the present invention, and not in limitation thereof.

What is claimed is:

1. A data processing system comprising:
   a data storage subsystem;
   selection logic, responsive to a detection that a copy command has been invoked, for
      automatically identifying at least one target pool comprising eligible target volumes,
      for each source volume of a source group, said selection logic further for one of determining that a pairing cannot be made, and automatically pairing the source volume to one of the eligible target volumes that satisfies at least one technical compatibility parameter of the source volume and a user defined metric; and
   circuitry for automatically returning a message listing each source volume for which a pairing to an eligible target volume was not made;
   wherein the user-defined metric is stored on a computer-readable medium from which a user may select from among at least a recovery point objective, a recovery time objective, a location, a consistency of underlying data, and an application impact.

2. The data processing system of claim 1 wherein the user-defined metric comprises at least two metrics and a user policy to implement the at least two metrics.

3. The data processing system of claim 1 wherein the selection logic for determining and automatically pairing further comprises logic for indexing the source volumes in each of a plurality of source groups, and wherein the selection logic iteratively executes the one of determining and automatically pairing for each indexed source volume of one of the source groups before executing for each indexed volume of another of the source groups.

4. A data processing system as in claim 1 further comprises at least one host data processor coupled to said data storage subsystem through a bus, and where said host data processor comprises said selection logic.

5. A data processing system comprising:
   a data storage subsystem;
   selection logic, responsive to a detection that a copy command has been invoked, for
      automatically identifying at least one target pool comprising eligible target volumes,
      for each source volume of a source group, said selection logic further for one of determining that a pairing cannot be made, and automatically pairing the source volume to one of eligible target volume that satisfies at least one technical compatibility parameter of the source volume; and
   circuitry for automatically returning a message listing each source volume for which a pairing to an eligible target volume was not made;
   wherein the selection logic further comprises
      a volume search loop whereby the source volumes are prioritized, and for each source volume, at least two weeks subsets of all eligible target volumes are searched for pairing using the parameter and a user defined metric; and
      a subgroup loop whereby subgroups of source volumes are prioritized, and for each searched for pairing using the subgroup, a subset of potential target pools for use therewith is identified.

6. A computer program product embodied in a computer readable media for causing a computer to execute program instructions resulting in execution of a method of selecting a target device to which data may be copied, comprising:
   determining a source group comprising source devices from which data is to be copied;
   automatically selecting at least one target pool comprising at least one target device that is eligible for copying based on at least one technical compatibility with at least one of the source devices;
   prioritizing subgroups of the source devices;
   dividing the subgroups into local sets, the local sets comprising: subgroups fully contained in an existing replica; subgroups partially contained in an existing replica; and subgroups not at all contained in an existing replica;
   for each of the prioritized subgroups in at least one of the local sets, determining which of the target pools are eligible for pairing with a source device within the subgroup;
   individually prioritizing the source devices;
   for each prioritized source device of the subgroups in at least one of the local sets, one of automatically pairing said source device to one of said at least one target device from the selected at least one target pool, and determining that a pairing cannot be made; and
   outputting a message indicating one of: all source group devices are paired, and
   not all source group devices are paired.

7. The computer program of claim 6 further comprising assessing connectivity from at least one of the source devices to potential pools of target devices and considering only those connected to at least one of the source devices via a data pathway.

8. The computer program of claim 6 further comprising generating an output report that lists at least one of pairings that were generated and source devices for which a pairing could not be generated.

9. The computer program of claim 6 wherein automatically selecting at least one target pool is additionally based on a user-defined metric.

10. The computer program of claim 9 wherein the user-defined metric comprises at least one of a recovery point objective, a recovery time objective, a location, a consistency among underlying data, and an application impact.

11. The computer program of claim 9 wherein the user-defined metric comprises at least two user-defined metrics that comprise a user policy.

12. The computer program of claim 11 wherein automatically pairing one target device comprises pairing a target device that is optimized according to the user policy.

13. A computer program product embodied in a computer readable media for causing a computer to execute program instructions resulting in execution of a method of selecting a target device to which data may be copied, comprising:
   determining a source group comprising at least one source device from which data is to be copied;
   automatically selecting at least one target pool comprising at least one target device that is eligible for copying based on at least one technical compatibility with the at least one source device;
   for each said source device of the source group, one of automatically pairing said source device to one of the target devices from the selected target pool, and determining that a pairing cannot be made; and
   outputting a message indicating one of: all source groups devices are paired, and not all source group devices are paired;
wherein automatically pairing comprises searching for a target device within a first subset of the at least one pool of target devices, and if no match is found within the first subset, searching within a second subset of the at least one pool of target devices, and wherein the second subset excludes the pools of target devices that are within the first subset.

14. The computer program of claim 13 wherein the second subset comprises all pools of target devices within which at least one target device has already been paired to any source device.

15. The computer program of claim 13 wherein the first subset comprises all pools of target devices within which at least one target device has already been paired to a source device within a subgroup of source devices in which a current source device is a part.

16. The computer program of claim 13 wherein automatically pairing further comprises, if no match is found within the second subset of the at least one pool of target devices, searching for a target device within a third subset of the at least one pool of target devices.

17. The computer program of claim 16 wherein the third subset comprises all of the selected at least one target pools that are not within at least one of the first and second subsets.

18. A computer program product embodied in a computer readable media for causing a computer to execute program instructions resulting in execution of a method of selecting a target device to which data may be copied, comprising:
   determining a source group comprising at least one source device from which data is to be copied;
   automatically selecting at least one target pool comprising at least one target device that is eligible for copying based on at least one technical compatibility with the at least one source device;
   for each said source device of the source group, one of automatically pairing said source device to one of the target devices from the selected target pool, and determining that a pairing cannot be made; and
   outputting a message indicating one of: all source groups devices are paired, and not all source group devices are paired;
wherein automatically pairing comprises:
   determining all matching target devices that are eligible for copying;
   prioritizing said all matching target devices according to closeness of the match, wherein closeness is determined from at least one of technical compatibility and a user-defined metric; and
   selecting the closest match to pair with the source device.

19. A method of using a computer to select a target resource that matches a host resource comprising:
   determining at least one technical compatibility attribute of a host resource;
   accessing at least one user-defined metric stored in a computer readable memory;
   identifying pools of potential target resources that are connected to the host resource via a data pathway;
   searching all of the identified pools for a matching target resource that satisfies the at least one technical compatibility attribute and the at least one user-defined metric; and
   one of selecting the matching target resource and outputting a message indicating that no matching target resource was found;
wherein searching all of the identified pools comprises searching a first subset of the pools and, and if the matching target resource is not found within the first subset, searching a second subset of the pools wherein the first subset is excluded from the second subset, and further wherein selecting the matching target resource comprises selecting a matching target resource from at least two matching target resources that best matches the host resource.

* * * * *